United States Patent

[11] 3,622,917

| [72] | Inventor | Natalia Yakovlevna Arleevskaya<br>Drezdens Kaya al., 10, Korp. 2, kv. 52,<br>Leningrad, U.S.S.R. |
|---|---|---|
| [21] | Appl. No. | 769,903 |
| [22] | Filed | Oct. 23, 1968 |
| [45] | Patented | Nov. 23, 1971 |

[54] FILTER WITH PARALLEL COMPOSITE RESONATORS
4 Claims, 6 Drawing Figs.

[52] U.S. Cl. .................................................. 333/71, 333/30 M
[51] Int. Cl. ................................................. H03h 9/04, H03h 9/22, H03h 9/26
[50] Field of Search .................................... 333/71, 72

[56] References Cited
UNITED STATES PATENTS

| 2,799,832 | 7/1957 | Niederman et al. | 333/71 |
| 3,091,708 | 5/1963 | Harris | 333/71 UX |
| 3,098,205 | 7/1963 | Reuter | 333/71 |
| 3,290,621 | 12/1966 | Krambeer et al. | 333/71 |

FOREIGN PATENTS

| 130,124 | 1960 | U.S.S.R. | 333/71 |
| 141,959 | 1961 | U.S.S.R. | 333/71 |
| 144,244 | 1962 | U.S.S.R. | 333/71 |

Primary Examiner—Herman Karl Saalbach
Assistant Examiner—Wm. N. Punter
Attorney—Waters, Roditi, Schwartz & Nissen ABSTRACT: An electromechanical band-pass filter designed for high-selective filtering of electric signals within the frequency range of several kilocycles. The filter is characterized in that each of the resonators includes two parts, one of which is shaped as a dumbbell and the other of which is attached to one of the thickened ends of the dumbbell.

PATENTED NOV 23 1971  3,622,917
FIG. 2  FIG. 1
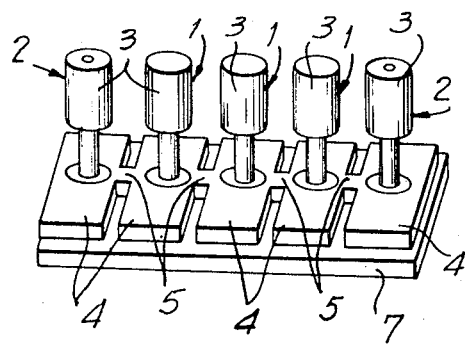
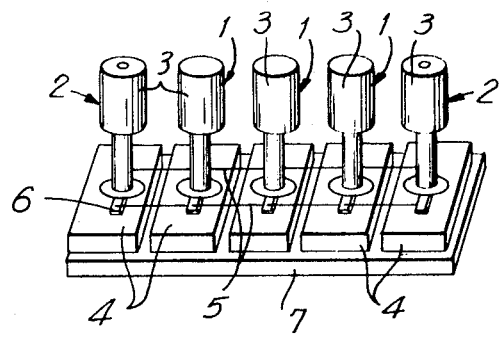
FIG. 3  FIG. 4
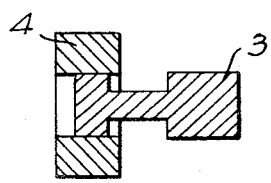
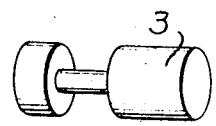
FIG. 5  FIG. 6
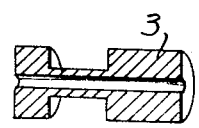
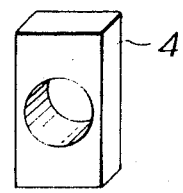

FILTER WITH PARALLEL COMPOSITE RESONATORS

The present invention relates to an electronic filter, and more specifically to ladder-type parallel electromechanical band-pass filters operating in the frequency range of the order of several Hertz, and can be used in radio engineering and communication systems in the synthesis of reliable small-size filters with narrow passbands and very flat attenuation characteristics, and also systems of several filters, each tuned to a different frequency.

In the prior art, there is a parallel ladder-type electromechanical band-pass filter with dumbbell resonators, dumbbell ferrite transducers and wire links.

Among the principal disadvantages of this filter are the reduced stiffness of the resonant system at frequencies below 10 Hz. and the impossibility of building such a filter for frequencies below 5 Hz. The reason is that the linear dimensions of the resonators have to be increased and a greater difference in diameter has to be made between the ends and the neck of the dumbbells as the operating frequency of the filter is lowered.

An object of the present invention is to eliminate the disadvantages listed above.

The present invention provides a highly reliable, small-size, highly selective electromechanical filter operating in the frequency range of several kiloHertz.

This is achieved as follows. Each resonator is made up of two parts, one being the shape of a dumbbell, and the other attached to one end of the dumbbell. The built-up parts should be preferably made as plates of rectangular cross section with a hole in the middle and of the same material as the dumbbells of all resonators, except the outer ones, and the dumbbells of the outer resonators should be preferably made of a magnetostrictive material, such as ferrite.

It is preferable to provide lugs on the built-up parts and to connect mechanical links directly to the lugs, or to use the broader portions of a variable-section plate as the built-up parts and the narrower portions as the links.

The parallel-type band-pass electromechanical filter disclosed herein has for the first time made it possible to obtain characteristics in the frequency range of several Hertz not realizable with any prior art filters.

The use of a resonator made up of two parts one being the shape of a dumbbell and the other attached to one end of the dumbbell and preferably made of a rectangular plate with a hole in the middle, has made it possible to reduce the dimensions of the filter system, to improve its stiffness, and to extend the operating frequency range of ladder-type parallel-resonator electromechanical filters into the low-frequency range.

The fact that the dumbbells of the outer resonators are fabricated of a magnetostrictive material, such as ferrite, makes it possible to use such resonators as magnetostrictive transducers.

The fabrication of the built-up parts of the same material as that of all resonators of the filter, except the outer resonators, enhances the temperature stability of the filter.

The attachment of the mechanical links directly to lugs on the built-up parts improves the reliability of the filter.

The use of a single plate of variable cross section, whose broader portions replace the built-up parts and the narrower portions act as links improves the stiffness of the resonant system and simplifies the manufacture of a large number of filters with identical fixed parameters.

The electromechanical filter disclosed herein provides for the highly selective filtering of electric signals in the frequency range from 3 to 10 with the passband adjustable as follows;

a. from 0.2 to 2 percent of the center frequency of the filter (when the system uses wire links attached to the resonator at the neck of the dumbbell);

b. from 0.1 to 2 percent of the center frequency of the filter (when the system uses wire links attached to lugs on the built-up parts);

c. from 0.5 to 2 percent of the center frequency of the filter (when the system uses a variable-section plate with the broader portions instead of the built-up parts and the narrower portions as links).

The attenuation characteristic of the filter, as determined at 3-db. and 40-db. levels (for a six-section filter), is flat within 1.5.

The selectivity of the filter is at least 70 db. when tuned to a frequency 1.5 passbands off resonance. The attenuation due to the filter itself does not exceed 10 db. within the passband.

The temperature coefficient of frequency in the temperature range from $-10°$ to $+60°$ C. is $\pm 10 \times 10^{-6}$ deg.$^{-1}$ (that is, 10 parts in a million per degree of temperature change).

The invention will be best understood from the following description of preferred embodiments when read in connection with the accompanying drawings, wherein:

FIG. 1 is a general view of the resonant system of a parallel-type electromechanical band-pass filter with links attached to lugs on the built-up parts, FIG. 2 is a general view of the resonant system of a parallel-type electromechanical band-pass filter with a variable-section resonating plate in which the broader portions are used instead of the built-up parts and the narrower portions act as links;

FIG. 3 is a longitudinal cross section through a filter resonator;

FIG. 4 shows the dumbbell portion of a filter resonator (except the outer ones);

FIG. 5 is a cross section through the dumbbell portion of an outer filter resonator made of a magnetostrictive material (ferrite), and FIG. 6 shows a built-up part of the resonator in the form of a rectangular-section plate with an hole in the middle.

Referring to FIG. 1, the resonant system of a filter according to the invention comprises parallel resonators 1 and 2, each consisting of a dumbbell portion 3 and a built-up part 4 and mechanical links 5. The links 5 are wires. The dumbbell 3 and the built-up part 4 are held together by bonding.

The built-up parts 4 of all resonators 1 and 2 are made in the form of a rectangular-section plate with a hole in the middle, from the same material as the dumbbell portions 3 of the resonators 1. The dumbbell portions 3 of the resonators 2 are made of magnetostrictive ferrite and display circular magnetization. The built-up parts 4 have lugs 6 to which wire links 5 are welded. By varying the number of wire links, their diameter, and the location of welds, it is possible to adjust the band-pass of the filter within broad limits.

The resonators are attached to a base 7 by pins (not shown in the drawing).

Referring to FIG. 2, the built-up parts 4 of the resonators are the broader portions of a variable-section plate whose narrower portions serve as the links. The dumbbell portions of all resonators are attached to the resonating plate by bonding.

The miniature ladder-type electromechanical band-pass filter disclosed herein can be realized for any frequency in the range from 3 to 10 Hz. In the course of fabrication the mechanical systems can be readily rearranged, which is especially valuable when making a series of filters tuned to different frequencies.

In the frequency range quoted, filters may be made of standard components.

What is claimed is:

1. A parallel type electromechanical band-pass filter comprising a plurality of transducers and a plurality of resonators, respective ones of said transducers being mechanically linked to respective ones of said resonators, each of said resonators having two parts, one of said two parts being in the form of a dumbbell having ends and the other of said two parts being attached to an end of said dumbbell, and at least one resonator of said plurality of resonators being provided with a built-up portion, said built-up portion being formed of a rectangular plate having a middle and being provided with a hole in said middle.

2. A filter, as claimed in claim 1, in which said built-up portion includes lugs for direct attachment of mechanical links.

3. A parallel type electromechanical band-pass filter comprising a plurality of transducers and a plurality of resonators, respective ones of said transducers being mechanically linked to respective ones of said resonators, each of said resonators having two parts, one of said two parts being in the form of a dumbbell having ends and the other of said two parts being attached to an end of said dumbbell, said two parts of at least one resonator of said plurality of resonators are made of the same material, and at least one resonator of said plurality of resonators being provided with a built-up portion, said built-up portion being formed of a rectangular plate having a middle and being provided with a hole in said middle.

4. A parallel-type electromechanical band-pass filter comprising a plurality of transducers and a plurality of resonators, respective ones of said transducers being mechanically linked to respective ones parts, said resonators, each of said resonators having two parts, one of said two parts being in the form of a dumbbell having ends and the other of said two parts being attached to an end of said dumbbell, and the other of said two parts is provided with a variable-section plate having a narrow portion, said narrow portion serving as mechanical links for respective ones of said resonators and said transducers.

* * * * *

UNITED STATES PATENT OFFICE
CERTIFICATE OF CORRECTION

Patent No. 3,622,917          Dated November 23, 1971

Inventor(s) Natalia Yakovlevna Arleevskaya

It is certified that error appears in the above-identified patent and that said Letters Patent are hereby corrected as shown below:

Column 1, line 5: change "Hertz" to --kilocycles--

Column 1, line 15: change "10 Hz" to --10 kHz--

Column 1, line 16: change "5 Hz" to --5 kHz--

Column 2, line 53: change "from 3 to 10 Hz" to
                   --from 3 to 10 kHz--

Signed and sealed this 6th day of March 1973.

(SEAL)
Attest:

EDWARD M. FLETCHER, JR.                ROBERT GOTTSCHALK
Attesting Officer                      Commissioner of Patents